US012670459B2

(12) United States Patent
Watfa et al.

(10) Patent No.: US 12,670,459 B2
(45) Date of Patent: Jun. 30, 2026

(54) MACHINE LEARNING SYSTEM AND METHOD TO MANAGE ACTIVITY NOTIFICATIONS WITHIN UTILITY INFRASTRUCTURE

(71) Applicant: VERIZON PATENT AND LICENSING INC., Basking Ridge, NJ (US)

(72) Inventors: Allie K. Watfa, Champaign, IL (US); Christopher Lin, East Brunswick, NJ (US); Denis D. Avila, Broadlands, VA (US); Jordan Dao, Roanoke, TX (US); Michael Antony Raj, Bridgewater, NJ (US); Michael D. Hanson, Millington, NJ (US); Harold Fisher, The Colony, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 349 days.

(21) Appl. No.: 18/056,321

(22) Filed: Nov. 17, 2022

(65) Prior Publication Data

US 2024/0169296 A1     May 23, 2024

(51) Int. Cl.
*G06Q 10/0639* (2023.01)
*G06F 18/2132* (2023.01)

(52) U.S. Cl.
CPC ... *G06Q 10/06393* (2013.01); *G06F 18/2132* (2023.01)

(58) Field of Classification Search
None
See application file for complete search history.

(56) References Cited

U.S. PATENT DOCUMENTS

2004/0254757 A1* 12/2004 Vitale .................... H04L 43/50
                                                          702/122
2023/0274126 A1* 8/2023 Vijapur Gopinath Rao ...............
                                                          G06N 3/0464
                                                          706/21

FOREIGN PATENT DOCUMENTS

CA          3075015 A1 * 9/2021  ........... G08B 27/005

OTHER PUBLICATIONS

Juan A. Valchez, et al., "Historical analysis of accidents in chemical plants and in the transportation of hazardous materials," Journal of Loss Prevention in the Process Industries, vol. 8, Issue 2, 1995, pp. 87-96 (Year: 1995).*

* cited by examiner

*Primary Examiner* — Amanda Gurski

(57) ABSTRACT

Disclosed are techniques for managing activity notifications and determining incident scores for a plurality of locations indicating a level of vulnerability to damage or service disruption of an item of utility infrastructure. In an aspect, a method can include receiving an activity notification including an activity location; determining a location incident score for the activity location based a location-score heatmap; determining an activity notification disposition based on the incident score; and transmitting a message including the disposition. In another aspect a method can include training a location scoring model based on features from combined records including historical activity notifications and incident reports corresponding to a plurality of locations.

20 Claims, 6 Drawing Sheets

RECEIVE ACTIVITY NOTIFICATION INCLUDING ACTIVITY LOCATION

402

DETERMINE LOCATION INCIDENT SCORE BASED ON A LOCATION-SCORE HEATMAP

404

DETERMINE DISPOSITION BASED ON THE INCIDENT SCORE

406

TRANSMIT A MESSAGE INCLUDING THE DISPOSITION

408

MACHINE LEARNING SYSTEM AND METHOD TO MANAGE ACTIVITY NOTIFICATIONS WITHIN UTILITY INFRASTRUCTURE

BACKGROUND

Generally, maintenance of utility infrastructure is limited to providing repairs once a disruption has occurred. Utility infrastructure (such as fiber optic cables) is susceptible to damage from natural events or human mistakes.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
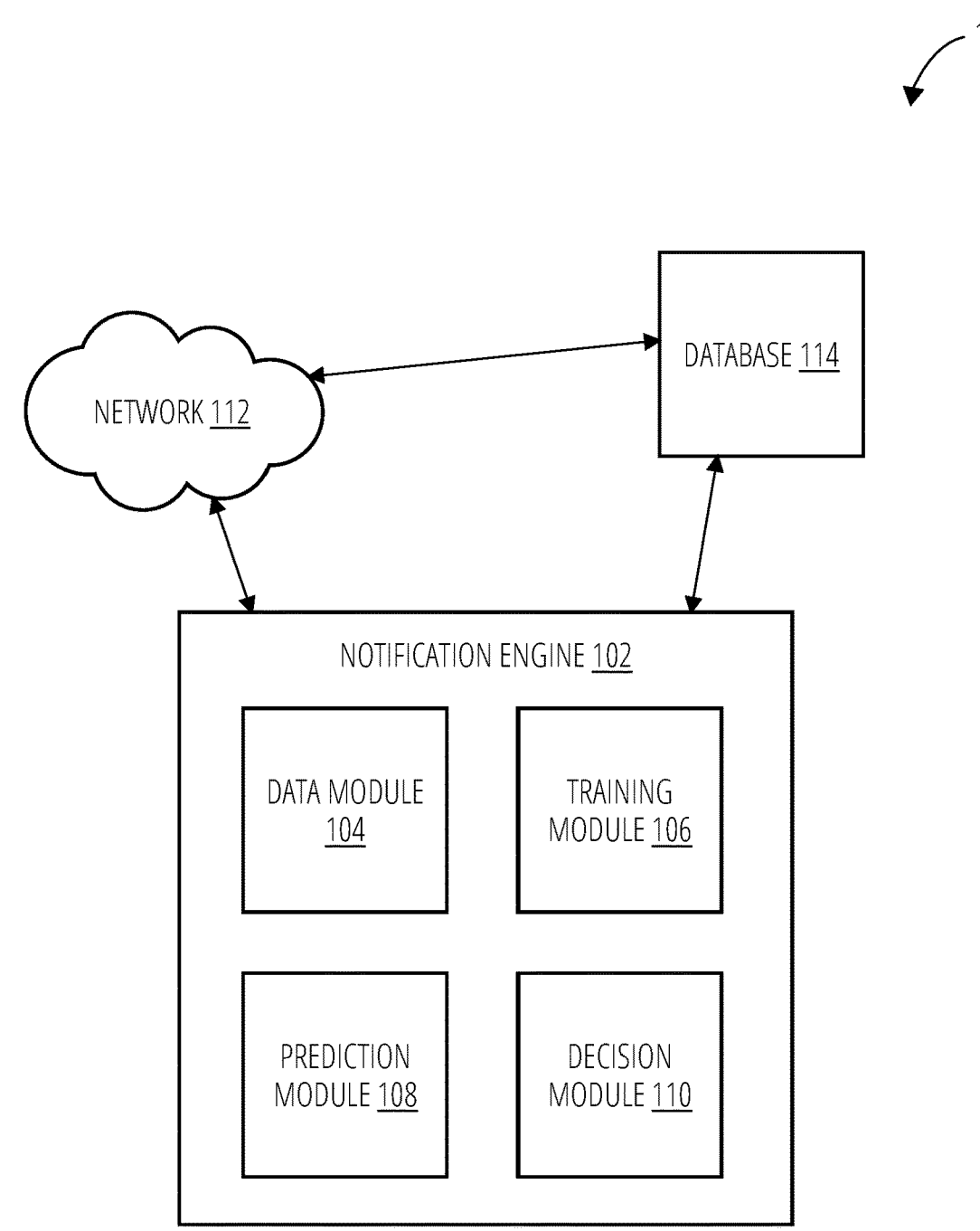
FIG. 1 is a block diagram illustrating components of a notification engine according to some embodiments.

The various embodiments provide methods for determining incident scores for a plurality of locations indicating a level of vulnerability to damage or service disruption of an item of utility infrastructure.

In the telecommunications context, such disruptions can lead to loss of network coverage or diminished network performance. Utility service operators attempt to mitigate potential disruptions by requiring notification in advance of activities that can potentially cause damage to the infrastructure. However, this approach generates a large volume of reports with inconsistent or incomplete data. Additionally, not all notifications merit a response.

In some aspects, the techniques described herein relate to a method including receiving an activity notification including an activity location; determining a location incident score for the activity location based a location-score heatmap; determining an activity notification disposition based on the incident score; and transmitting a message including the disposition.

In some aspects, the disposition can be selected from the group consisting of ignore the activity notification, flag the activity notification for human review, perform a physical task at the activity location, and provide instructions to an entity identified in the activity notification. In some aspects, the activity notification can include an entity and wherein the disposition is providing instructions to an equipment operator of the entity.

In some aspects, the method can further include receiving a plurality of historical activity notifications and incident reports corresponding to a plurality of locations, the historical activity notifications and incident reports including a plurality of features. Then, the method can generate a combined record for each of the plurality of locations based on the features, each combined record of each location including features from the activity notifications and the incident reports corresponding to the respective location. The method can include training a location scoring model based on the combined records. The method can further include receiving an equipment inventory including utility equipment and corresponding equipment locations, at least some of the equipment locations corresponding to at least some of the plurality of locations, and determining an equipment density matrix, the equipment density matrix including a subset of the plurality of locations and a corresponding equipment density based on the equipment locations. Finally, the method can include determining an incident score for each location in the subset by applying the location scoring model to each location in the subset, and generating a location-score heatmap including each location in the subset with the corresponding incident score.

In some aspects, the method can include selecting a training dataset and a testing dataset from the combined records. Then, the method can include training the location scoring model using the training dataset and validating the model using the testing dataset to optimize a coefficient of determination (e.g., $r^2$ metric). In some aspects, the location scoring model can be a gradient boosting model.

In some aspects, a feature of the historical activity notifications can be an activity timeframe and a feature of the historical incident reports can be an incident date and generating the combined records can include combining activity notifications and incident reports having activity locations within a predetermined distance of each other and having activity timeframes and incident dates within a predetermined time span.

In some aspects, the activity notification can include an entity and the disposition can be selected from the group consisting of ignore the activity notification, flag the activity notification for human review, perform a physical task at the activity location, and provide instructions to a machinery operator of the entity.

In some aspects, the techniques described herein relate to a non-transitory computer-readable storage medium for storing instructions executable by a processor, the instructions comprising receiving an activity notification including an activity location; determining a location incident score for the activity location based a location-score heatmap; determining an activity notification disposition based on the incident score; and transmitting a message including the disposition.

In some aspects, the techniques described herein relate to a device comprising a processor configured to perform a method comprising receiving an activity notification including an activity location; determining a location incident score for the activity location based a location-score heatmap; determining an activity notification disposition based on the incident score; and transmitting a message including the disposition.

FIG. 1 is a block diagram illustrating components of a notification system according to some embodiments.

According to some embodiments, system 100 can include notification engine 102, network 112, and database 114. In some embodiments, notification engine 102 can be a special purpose machine or processor and could be hosted by a cloud server (e.g., cloud web services server(s)), messaging server, application server, content server, social networking server, web server, search server, content provider, third party server, user's computing device, and the like, or any combination thereof.

Figure 6:
FIG. 6 is a block diagram of a device according to some embodiments.
Figure 6:
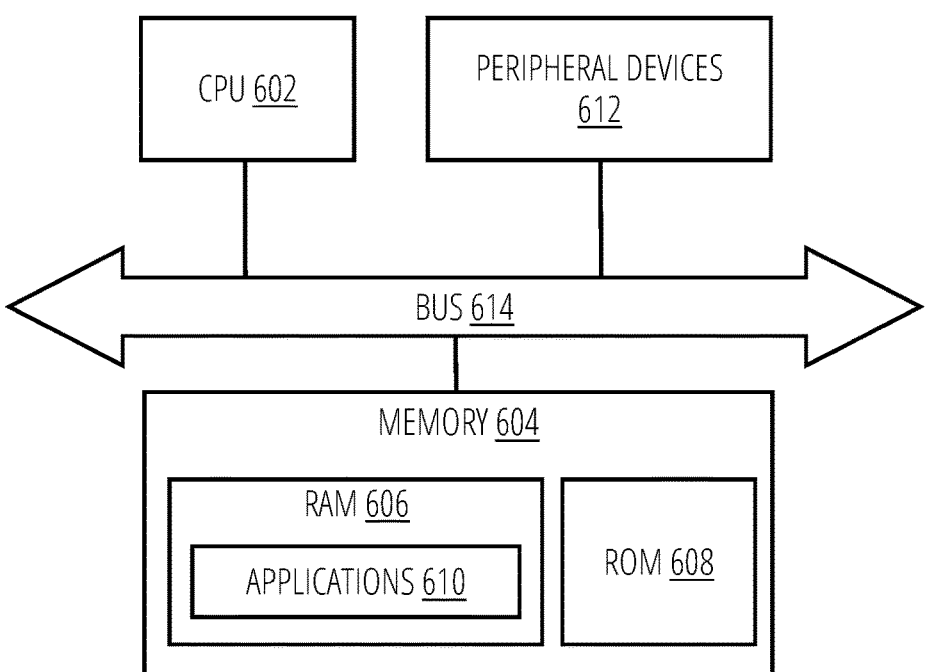

According to some embodiments, notification engine 102 can be a stand-alone application that executes on a computing device (e.g., device 600 from FIG. 6). In some embodiments, notification engine 102 can function as an application installed on the computing device, and in some embodiments, such application can be a web-based application accessed by the computing device over a network. In some embodiments, portions of the notification engine 102 function as an application installed on the computing device and some other portions can be cloud-based or web-based applications accessed by the computing device over a network, where the several portions of the notification engine 102 exchange information over the network. In some embodiments, the notification engine 102 can be installed as an augmenting script, program or application (e.g., a plug-in or extension) to another application or portable data structure.

In some embodiments, the database 114 can be any type of database or memory, and can be associated with a content server or an application server on a network or a computing device. In some embodiments, database 114 may include a dataset of data and metadata associated with customers, utility equipment, activity notifications, incidents, entities, services, applications, requests, and the like. In some embodiments, database 114 can include historical reports and records corresponding to activity notifications, incidents, and equipment. In some embodiments, such information can be stored and indexed in the database 114 independently and/or as a linked or associated dataset (e.g., using unique identifiers). For example, in some embodiments, activity notifications, incident reports, and equipment can be linked using their respective unique identifiers.

According to some embodiments, database 114 may store data and metadata associated with messages, images, videos, text, products, documents, items and services from an assortment of media, applications and/or service providers and/or platforms, and the like. Accordingly, any other type of known or to be known attribute or feature associated with a record, inventory, request, data item, media item, website, application, communication (e.g., a message) and/or its transmission over a network, an entity and/or content included therein, or some combination thereof, can be saved as part of the data/metadata in database 114.

According to some embodiments, network 112 can be any type of network such as, but not limited to, a wireless network, a local area network (LAN), wide area network (WAN), the Internet, or a combination thereof. In some embodiments, network 112 may facilitate connectivity of the notification engine 102, and the database 114. Indeed, as illustrated in FIG. 1, the notification engine 102 and database 114 can be directly connected by any known or to be known method of connecting and/or enabling communication between such devices and resources.

The principal processor, server, or combination of devices that comprise hardware programmed in accordance with the special purpose functions herein is referred to for convenience as notification engine 102, and includes data module 104, training module 106, prediction module 108, and decision module 110. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 2:
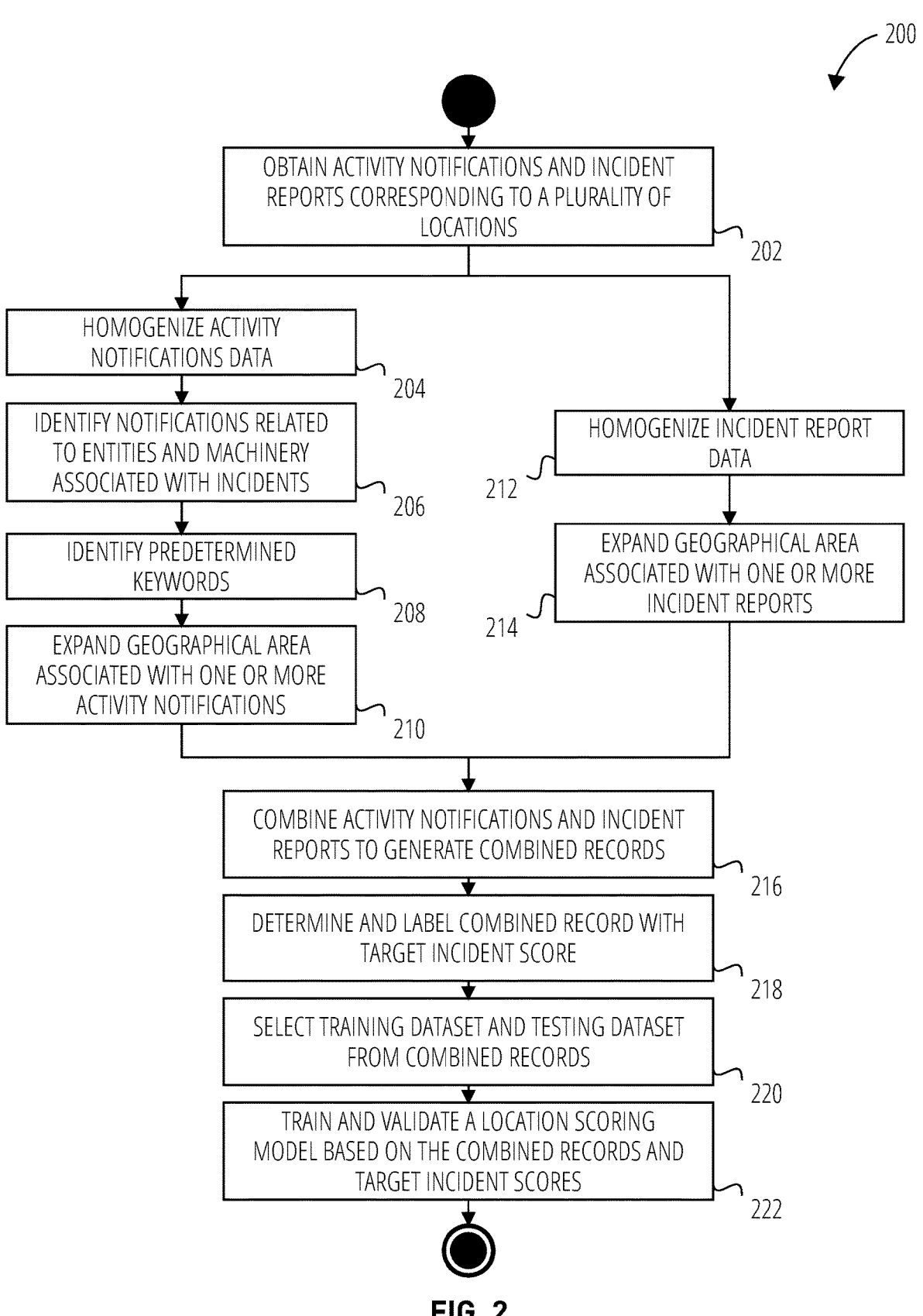
FIG. 2 is a flow diagram illustrating a method for training a location scoring model according to some embodiments.

FIG. 2 is a flow diagram illustrating a method for training a location scoring model according to some embodiments.

According to some embodiments, the Steps of method 200 can be performed by notification engine 102 discussed in relation to FIG. 1. For example, in some embodiments, Steps 202-220 can be performed by data module 104, and Step 222 can be performed by training module 106.

In Step 202, method 200 can include obtaining historical records including activity notification reports, incident reports, and/or other reports corresponding to a plurality of locations. In some embodiments, the records can encompass a specific timeframe (e.g., last year, last month, set of months) and/or a specific geographical area (e.g., a county, a city, or a set of city blocks). In some embodiments, obtaining the records can include retrieving the records from a database over a network (e.g., by data module 104 from database 114). In some embodiments, obtaining the records can include querying a server over a network and receiving the records from the server over the network. In some embodiments, obtaining the historical records can include obtaining separate records for specific types of reports.

In some embodiments, a record can be a collection of data and metadata in tabulated form corresponding to one or more reports (e.g., activity notifications, incident reports, or other reports). In some embodiments, each item of data or metadata associated with a report in a record can be referred to as a feature. Thus, in some embodiments, each record can have a plurality of features associated with each of a plurality of reports. In some embodiments, a record can be generated by a computing device based on a plurality of reports.

According to some embodiments, a report can be any type of report received, generated, and/or stored by a utility company. For example, in some embodiments, a report can be an email, a message, a transcript of a call, a machine generated document, a digitized physical document, an image, a video, or an audio file. In some embodiments, a report can include content and/or metadata.

According to some embodiments, an activity notification report can be a type of report that can include a notification by an entity (e.g., a company or individual) indicating when and where an activity may take place that could damage or disrupt utility infrastructure. For example, an activity notification can be a notification received through a utility hotline. Some utility hotlines are colloquially known as "Call-before-you-dig" hotlines. In some embodiments, an activity notification can be a construction permit application or granted permit from a governmental organization. In some embodiments, an activity can be any type of activity that can lead to damage, deactivation, or unwanted performance of an item of utility infrastructure. In some embodiments, activities can include digging, drilling, excavating, or otherwise disturbing an area where utility infrastructure may be located.

In some embodiments, an activity notification report can include a timeframe when the activity will take place, a duration of the activity, a unique activity notification identifier, the date the notification was received or generated, an activity location, parties involved, machinery used; or other information corresponding to the activity, the entity, or the location. In some embodiments, the activity notification report can include location data corresponding to the activity location. In some embodiments, location data can include coordinates in any coordinate format (e.g., latitude and longitude) and/or an address. In some embodiments, the activity notification report can include an action or disposition taken by the utility with respect to the notification. In some embodiments, a disposition can be ignore the notification, flag the notification for human review, transmit instructions to perform a physical task at the location (e.g., physically mark a piece of equipment associated with the location), and/or transmit a message to an entity identified in the activity notification or a third party. For example, in some embodiments, the activity notification report can indicate that an underground piece of equipment was physically marked in response to the notification.

According to some embodiments, an incident report can be a type of report that includes information corresponding to an incident related to an item of utility infrastructure (also referred to herein as utility equipment). In some embodiments, an incident can be damage to equipment or unplanned disruption of the normal operation of the equipment. In some embodiments, an incident report can include an incident location, an incident date (e.g., date when the incident occurred), a duration (e.g., of service outage or equipment downtime), a type of incident, an indication of customer impact (e.g., number of customers affected by an outage), the equipment involved, a geographical area associated with the equipment (e.g., the area serviced by the equipment), the type of activity that led to the incident, the entities involved, the machinery used, a unique report identifier, the date the incident report was generated or received; or other information corresponding to the equipment, the entities involved, or the location. In some embodiments, the incident report can include location data corresponding to the incident location. In some embodiments, location data can include coordinates in any coordinate format (e.g., latitude and longitude) and/or an address.

For example, in some embodiments, a type of incident can be a damaged piece of infrastructure equipment. In some embodiments, the type of incident can be a cut to a fiber optic cable or other cable of a telecommunications utility. In some embodiments, the incident report can indicate whether the equipment was above ground or underground. In some embodiments, the incident report can indicate a characteristic of the equipment. For example, in some embodiments, the incident report can indicate whether a cable was exposed to the elements or encased in a conduit. In some embodiments, the incident report can indicate whether a piece of equipment had one or more fibers, cables, or circuits. In some embodiments, the incident report can indicate a level of damage to a piece of equipment. For example, in some embodiments, an incident report can indicate that a cable encased in a conduit was completely cut or that only the conduit was breached. In some embodiments, an incident report can indicate how many and which fibers, cables, or circuits were damaged.

In Step 204, method 200 can include homogenizing data corresponding to activity notification reports in a record. For example, in some embodiments, different activity notifications can have location data in different formats (e.g., some activity notifications can indicate addresses while others indicate coordinates). In some of those embodiments, in Step 204, method 200 can include identifying coordinates associated with the addresses and modifying the activity notification records to add the coordinates to the activity notifications with addresses. In some embodiments, method 200 can include identifying activity notification features of the same type (e.g., dates, names, unique identifiers, and the like) with different formats and modifying the activity notification records so that features of the same type follow a specific format or standard (e.g., MM-DD-YY, "lastname, firstname," or latitudes and longitudes in decimal degrees).

In Step 206, method 200 can include identifying activity notification records related to entities or machinery that have been predetermined to have a high risk of causing an incident. In Step 206, method 200 can further include modifying the activity notification record to add a new feature to the activity notification indicating a level of risk based on the entity or machinery. In some embodiments, entities or machinery likely to damage utility equipment can be considered high risk and an activity notification involving such companies and machinery can be labeled as such. For example, in some embodiments, machinery such as excavators can be determined to be high risk because operators are likely to cut buried cables when digging. In another example, in some embodiments, a given company can be determined to be high risk because said company is an earthmoving company and such companies are likely to cause an incident in the course of rendering their services. In some embodiments, the activity notifications records can be culled to only include activity notifications associated with machinery or entities with a high likelihood of causing an incident.

In some embodiments, some activity notifications can include keywords added to the activity notification as content or metadata. In some embodiments, the predetermined keywords are representative of important information in the activity notification. For example, in some embodiments, an activity notification can include the keywords "mark site" in reference to a disposition or "road work" or "boring" in reference to an activity. In some embodiments, the keywords may not be readily identified as features. Thus, in Step 208, method 200 can include identifying one or more of the keywords included in the activity notifications and adding the keywords as features to the activity notification.

In Step 210, method 200 can include expanding the geographical area associated with one or more of the activity notifications. In some embodiments, expanding the geographical area can include truncating the coordinates of the location data of the activity notification. For example, in some embodiments, where latitudes and longitudes are in decimal degrees with a set number of decimals (e.g., 38.80154, −77.06411), truncating the coordinates can include shortening the coordinates to fewer decimals. In some embodiments, expanding the geographical area can include determining a larger geographical area to which the associated geographical area belongs. For example, in some embodiments, the associated geographical area is a residential address and expanding the geographical area can include determining a city or ZIP code to which the address corresponds.

In Step 212, method 200 can include homogenizing data corresponding to incident reports in a record. For example, in some embodiments, different incident reports can have location data in different formats—some incident reports can indicate addresses while others indicate coordinates. In some of those embodiments, in Step 212, method 200 can include identifying coordinates associated with the addresses and modifying the incident report records to add the coordinates to the incident reports with addresses. In some embodiments, method 200 can include identifying incident report features of the same type (e.g., dates, names, unique identifiers, and the like) with different formats and modifying the incident report records so that features of the same type follow a specific format or standard (e.g., MM-DD-YY, "lastname, firstname," or latitudes and longitudes in decimal degrees).

In Step 214, method 200 can include expanding the geographical area associated with one or more of the incident reports. In some embodiments, expanding the geographical area includes truncating the coordinates of the location data of the incident reports. For example, in some embodiments, where latitudes and longitudes are in decimal degrees with a set number of decimals (e.g., 38.80154, −77.06411), truncating the coordinates can include shortening the coordinates to fewer decimals. In some embodiments, expanding the geographical area can include determining a larger geographical area to which the associated geographical area belongs. For example, in some embodiments, the associated geographical area is a residential address and expanding the geographical area can include determining a city or ZIP code to which the address corresponds.

In Step 216, method 200 can include combining or otherwise linking related activity notification reports and incident reports to generate combined records. In some embodiments, the reports can be related and linked based on a location, a timeframe, unique identifiers, entity information, keywords, some other feature, or a combination thereof. For example, in some embodiments, the historical records can include an activity notification report (generated prior to any activity taking place) for a given location at a given timeframe and an incident report stemming from an incident at or near the given location after the given timeframe. In some embodiments, the reports can be linked based on whether the geographic area associated with the activity notifications (e.g., the result of Step 210) and the geographic area associated with the incident reports (e.g., the result of Step 214) overlap or occurred within a predetermined distance away (e.g., inside 1 mile) from either geographic area. In some embodiments, the records can be linked based on whether the timeframe in the activity notifications and the time of the incident in the incident report overlap or occurred with a given time span (e.g., within days, months, years, etc.).

In some embodiments, a combined record can indicate that an activity reported in an activity notification was the cause for a given incident. In some embodiments, a combined record can include one or more activity notifications and one or more incident reports. In some embodiments, the combined record can include features of the one or more activity notifications and the one or more incident reports.

In Step 218, method 200 can include determining and labeling each of the combined records with a target incident score. In some embodiments, the target incident score is automatically generated based on a set of predetermined values for each feature of a combined record. For example, in some embodiments, damage to a piece of equipment may have a value of 90, no damage may have a value of 70, the presence of a disposition may have a value of 40, and a particular piece of equipment may have a value of 50. In those embodiments, the target score can be a sum of all the values (e.g., incident score=90+70+40+50). In some embodiments, the target score can be a weighted sum of the values (e.g., incident score=$C_1$*(90)+$C_2$*(70)+$C_3$*(40)+$C_4$(50)) where the weights are predetermined based on the feature. In some embodiments, the target score can be normalized to a predetermined range (e.g., 0-1, 0-100). In some embodiments, the target score can be a probability (e.g., 0-100%). In some embodiments, the incident score can be a confidence level (e.g., Low, Medium, High). In some embodiments, the confidence level can be associated with a range of probabilities or feature values (e.g., Low=0%-33%; Medium=34%-66%, High=67%-100%). In some embodiments, the combined record can be labeled with one or more discrete target incident scores. In some embodiments, each discrete target incident score can be based on different features or groupings of features. In some embodiments, the combine record can be manually labeled by a human reviewer.

In Step 220, method 200 can include selecting a training dataset and a testing dataset from the combined records. In some embodiments, the training dataset and testing dataset can be used for training and validating, respectively, a location scoring model. In some embodiments, the training dataset and the testing dataset can be selected by randomly selecting subsets of combined records from the full set of combined records. In some embodiments, the training dataset and the testing dataset can have a ratio of 2:1 combined records.

In Step 222, method 200 can include training a location scoring model using the training dataset. In Step 222, method 200 can also include validating the location scoring model using the testing dataset. In some embodiments, the location scoring model can implement a machine learning model or algorithm. In some embodiments, the location scoring model can include a gradient boosting framework such as XGBoost. In some embodiments, the location scoring model can include a decision tree algorithm and/or a random forest algorithm. In some embodiments, training and validating the location scoring model can include evaluating the performance of the model based on the $r^2$ metric of the model. In some embodiments, Step 222 (and/or Steps 202-220 as needed) can be repeated periodically (e.g., monthly, quarterly) to update the model and include additional historical records as they become available. In some embodiments, training and validating the location scoring model can be performed by training module 106.

Figure 3:
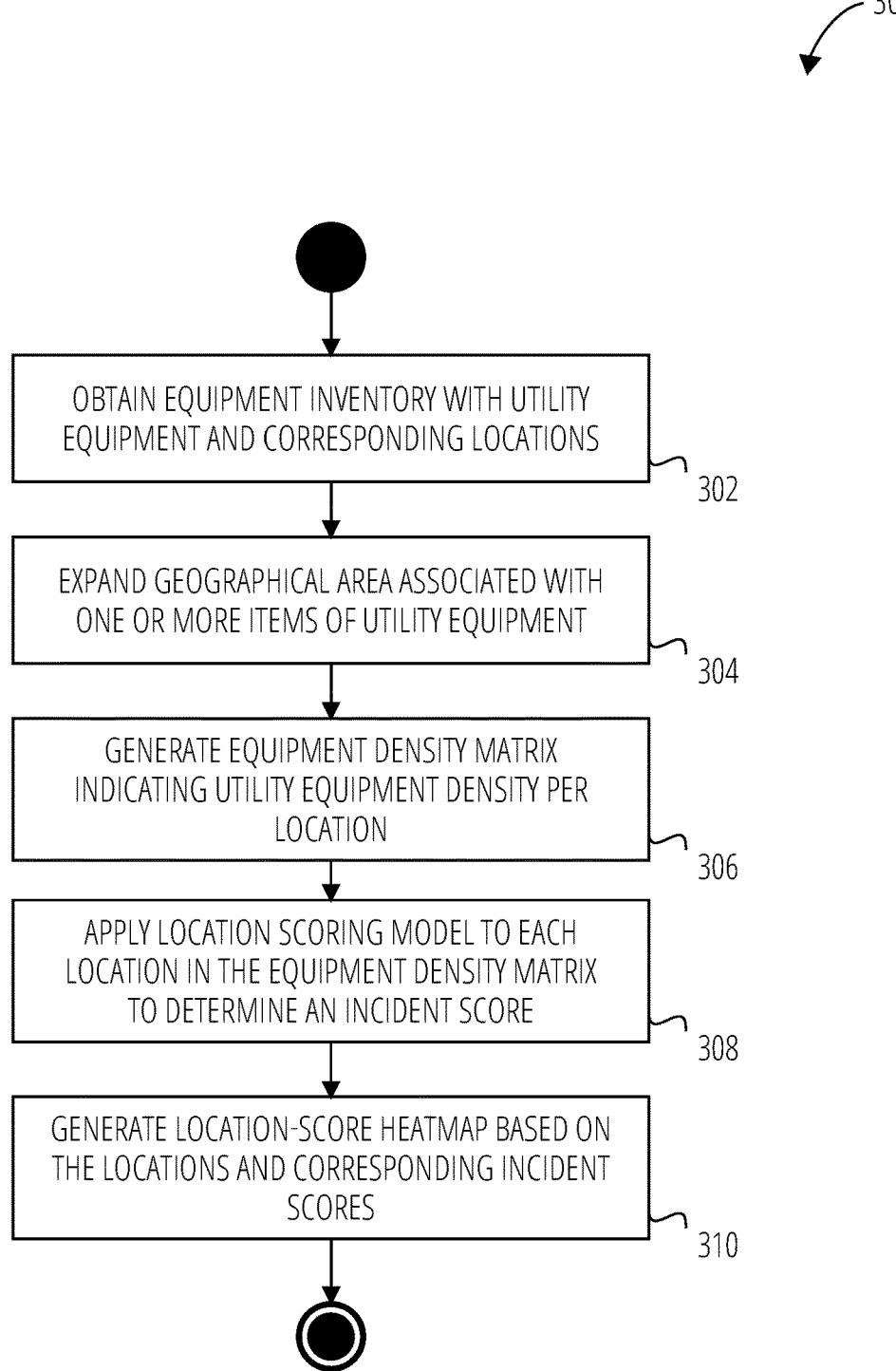
FIG. 3 is a flow diagram illustrating a method for generating a location-score heatmap according to some embodiments.

FIG. 3 is a flow diagram illustrating a method for generating a location-score heatmap according to some embodiments.

According to some embodiments, the Steps of method 300 can be performed by notification engine 102 discussed in relation to FIG. 1. For example, in some embodiments, Steps 302-306 and 310 can be performed by data module 104, and Step 308 can be performed by prediction module 108.

In Step 302, method 300 can include obtaining a utility equipment inventory. In some embodiments, an equipment inventory includes utility equipment and the geographical location of one or more items of utility equipment. In some embodiments, obtaining the inventory can include retrieving the inventory from a database over a network (e.g., by data module 104 from database 114). In some embodiments, the inventory can include a unique equipment identifier for each piece of equipment. In some embodiments, the inventory can include location data indicating the exact location of an item of utility equipment or an area encompassed by the equipment. For example, in some embodiments, where the equipment is a cable extending over a distance, the location data can include a plurality of locations along the distance corresponding to the cable. In some embodiments, location data can include coordinates in any coordinate format (e.g., latitude and longitude) and/or an address. In some embodiments, each item of data or metadata associated with a piece of equipment in the equipment inventory can be referred to as a feature.

In some embodiments, the inventory can include a plurality of characteristics of the piece of equipment. In some embodiments, the characteristics can include a type of equipment and a number of customers served by the equipment.

In Step 304, method 300 can include expanding the geographical area associated with one or more of items of utility equipment in the inventory. In some embodiments, expanding the geographical area can include truncating the coordinates of the location data (as discussed elsewhere herein). In some embodiments, prior to Step 304, method 300 can include homogenizing location data for some or all pieces of equipment in the inventory (e.g., by determining the coordinates corresponding to an address). In some embodiments, expanding the geographical area can include determining a larger geographical area to which the associated geographical area belongs. For example, in some embodiments, the associated geographical area is a residential address and expanding the geographical area can include determining a city or ZIP code to which the address corresponds.

In Step 306, method 300 can include generating an equipment density matrix indicating densities of utility equipment for each of a plurality of locations. In some embodiments, in Step 306, method 300 can include determining the equipment density of a given location based on the number of items of utility equipment with associated geographical areas (including the expanded geographical area determined in Step 304) that encompass the given location (or are located within a predetermined distance of the given location). In some embodiments, equipment density matrix includes a set of locations with corresponding equipment densities.

In Step 308, method 300 can include applying a location scoring model to each location in the equipment density matrix. In some embodiments, the location scoring model can be the location scoring model trained and validated by method 200 discussed in relation to FIG. 2. In some embodiments, the location scoring model can determine an incident score for a given location. In some embodiments, the incident score can indicate a likelihood of damage to equipment associated with a given location. In some embodiments, in Step 308, method 300 can include applying the location scoring model to each location of a set of locations with corresponding equipment densities in the equipment density matrix to determine an incident score for each location in the set.

In Step 310, method 300 can include generating a location-score heatmap based on the incident scores. In some embodiments, the location-score heatmap can include a plurality of locations and corresponding incident scores. In some embodiments, each of the plurality of locations have an associated geographic area whereby each piece of equipment within the geographic area associated with a given location have the same incident score. In some embodiments, a heatmap can be a visual description of locations and incident scores. In some embodiments, a heatmap can be a list of locations and incident scores.

Figure 4:
FIG. 4 is a flow diagram illustrating a method for determining an activity notification disposition according to some embodiments.
Figure 4:
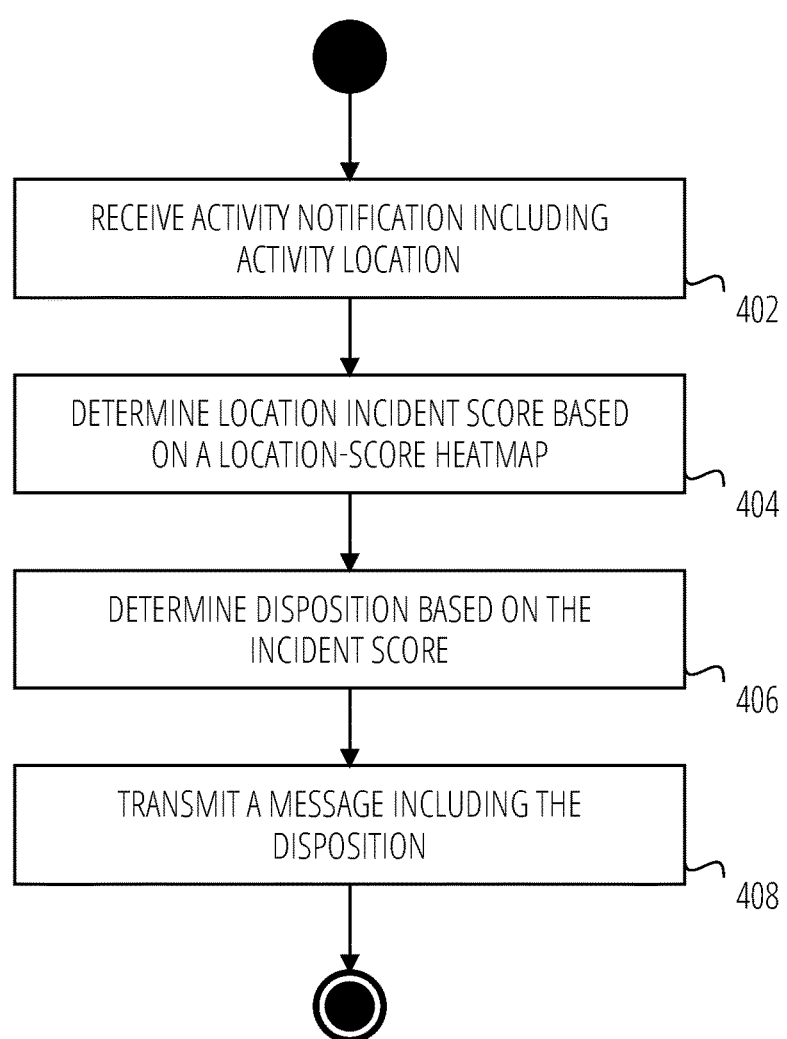

FIG. 4 is a flow diagram illustrating a method for determining an activity notification disposition according to some embodiments.

According to some embodiments, the Steps of method 400 can be performed by notification engine 102 discussed in relation to FIG. 1. For example, in some embodiments, Steps 402 and 408 can be performed by data module 104, and Steps 404 and 406 can be performed by decision module 110.

In Step 402, method 400 can include receiving an activity notification report corresponding to an activity that could damage or disrupt utility infrastructure. In some embodiments, an activity notification can be an email, a message, a transcript of a call, a machine generated document, a digitized physical document, an image, a video, or an audio file. In some embodiments, an activity notification can include content and/or metadata. In some embodiments, an activity notification can be a notification by an entity (e.g., a company or individual) indicating when and where the activity may take place. For example, an activity notification can be a notification received through a utility hotline (e.g., 811— "Call-before-you-dig"). In some embodiments, an activity notification can be a construction permit application or granted permit from a governmental organization. In some embodiments, an activity can be any type of activity that can lead to damage, deactivation, or unwanted performance of utility equipment (e.g., an item of utility infrastructure). In some embodiments, activities can include digging, drilling, excavating, or otherwise disturbing an area where utility infrastructure may be located.

In some embodiments, an activity notification report can include a timeframe when the activity will take place, a duration of the activity, a unique activity notification identifier, the date the notification was received or generated, an activity location, parties involved, machinery used; or other information corresponding to the activity, the entity, or the location. In some embodiments, the activity notification report can include location data (e.g., coordinates or addresses) corresponding to the activity location. In some embodiments, the location data can include an exact activity location and/or an area encompassing the exact activity location (e.g., 100 yard radius centered around the exact activity location). In some embodiments, in Step 402, method 400 can include expanding the geographical area associated with the activity location as discussed herein (e.g., by truncating coordinates).

In Step 404, method 400 can include determining an incident score for the activity location included in the activity notification report. In some embodiments, method 400 can include matching the activity location or the area encompassing the activity location to a location in the location-score heatmap (e.g., generated by method 300 as discussed in relation to FIG. 3) and identifying the incident score associated with the location in the location-score heatmap. Then, in some embodiments, method 400 can include adding the incident score to the report (e.g., by adding the incident score as content or metadata). In some embodiments, matching the activity location to the location in the heatmap can include comparing the coordinates or addresses of the two locations and determining whether the locations are within a predetermined distance of each other.

In Step 406, method 400 can include determining a disposition with respect to the activity notification based on the incident score. In some embodiments, a disposition can be an action taken by a utility company in response to receiving an activity notification. In some embodiments, a disposition can be ignore the notification, flag the notification for human review, perform a physical task at the activity location, and/or provide information or instructions to an entity identified in the activity notification or some other third party.

According to some embodiments, a given disposition can be associated with an incident score or range of incident scores. For example, in some embodiments, if the activity location has a High incident score (e.g., 67%-100%), method 400 can include flagging the notification for human review and instructing the entity associated with the activity to stop work pending the human review. In another example, in some embodiments, if the activity has a Medium incident score (e.g., 34%-66%), method 400 can include transmitting instructions to a dispatch center to dispatch a technician to physically mark or identify the equipment around the activity location or to assist in the completion of the activity. In another example, in some embodiments, if the activity has a Low incident score (e.g., 0%-33%), method 400 can include ignoring the activity notification or transmitting instructions within the organization to ignore the activity notification.

In Step 408, method 400 can include transmitting a message including the disposition where the recipient is determined by the disposition. In some embodiments, the message can be transmitted to internal recipients (e.g., within the utility company) or to external recipients. For example, in some embodiments, the message can be transmitted to an internal organization such as a dispatch center or an operations control center of the utility company. In some embodiments, the message can be transmitted to the entity identified in the activity notification (e.g., a point of contact in a company or a worker). In some embodiments, the message can be transmitted to a third party (e.g., a contractor of the utility company). In some embodiments, a message to an entity or third party can include instructions related to the activity (e.g., clear to proceed with activity, stop work, or proceed with caution). In some embodiments, the message can include a warning to a machinery operator that there may be utility equipment nearby.

Figure 5:
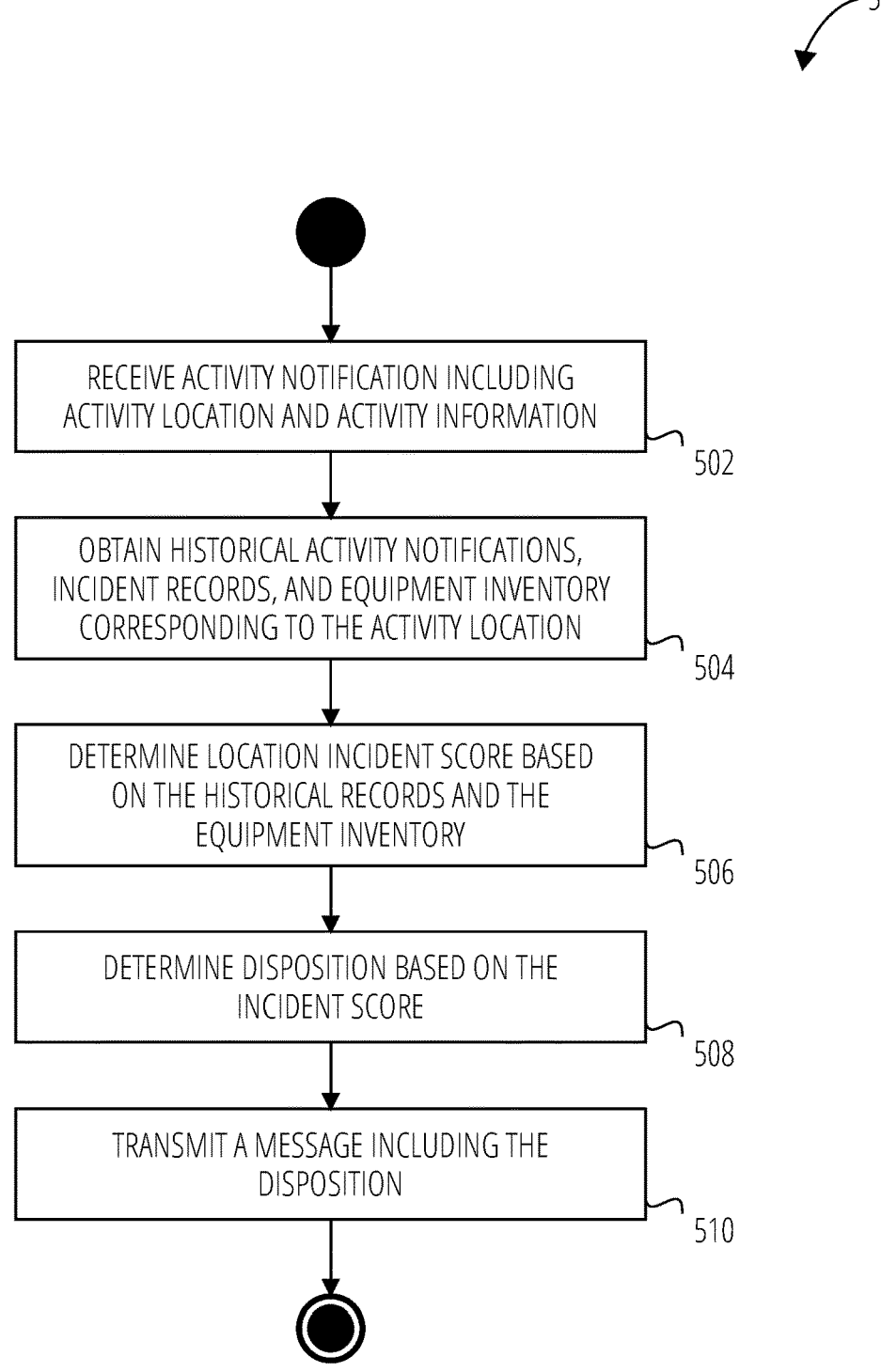
FIG. 5 is a flow diagram illustrating a method for determining an activity notification disposition according to some embodiments.

FIG. 5 is a flow diagram illustrating a method for determining an activity notification disposition according to some embodiments.

According to some embodiments, the Steps of method 500 can be performed by notification engine 102 discussed in relation to FIG. 1. For example, in some embodiments, Steps 502, 504, and 510 can be performed by data module 104, and Steps 506-508 can be performed by decision module 110.

In Step 502, method 500 can include receiving an activity notification report corresponding to an activity that could damage or disrupt utility infrastructure (e.g., as discussed in relation to Step 402 of FIG. 4). In some embodiments, the activity notification report can include a timeframe when the activity will take place, a duration of the activity, a unique activity notification identifier, the date the notification was received or generated, an activity location, parties involved, machinery used; or other information corresponding to the activity, the entity, or the location. In some embodiments, the activity notification report can include location data (e.g., coordinates or addresses) corresponding to the activity location. In some embodiments, the location data can include an exact activity location and/or an area encompassing the exact activity location (e.g., 100 yard radius centered around the exact activity location). In some embodiments, in Step 502, method 500 can include expanding the geographical area associated with the activity location as discussed elsewhere herein (e.g., by truncating coordinates).

In Step 504, method 500 can include obtaining historical records including activity notification reports and incident reports, and an equipment inventory corresponding to a plurality of locations (including the activity location). In some embodiments, Step 504 is similar to Steps 202 and 302, discussed in relation to FIG. 2 and FIG. 3, respectively. In some embodiments, the records can encompass a specific timeframe (e.g., last year, last month, set of months) and/or a specific geographical area (e.g., a county, a city, or a set of city blocks). In some embodiments, a record can be a collection of data and metadata in tabulated form corresponding to one or more reports (e.g., activity notifications, incident reports, or other reports). In some embodiments, an equipment inventory can include utility equipment belonging to a utility company, the geographical location of each piece of equipment, and characteristics of each piece of equipment, as discussed herein. In some embodiments, each item of data or metadata associated with a report in a record or a piece of equipment in the inventory can be referred to as a feature.

In Step 506, method 500 can include determining an incident score for the activity location included in the activity notification report. In some embodiments, determining the incident report includes determining a plurality of discrete incident scores based on the features. For example, in some embodiments, method 500 can determine a first incident score based on historical activity notification features, a second incident score based on historical incident reports, a third incident score based on the distance from the activity location to the nearest utility equipment, and a fourth incident score based on the characteristics of the nearest piece of equipment (e.g., number of circuits, number of customers served, etc.). In some embodiments, the total incident score can be a weighted sum of the first, second, third, and fourth discrete incident scores. In some embodiments, the incident score can be based on the entity or machinery identified in the activity notification. For example, in some embodiments, entities and machinery with a higher likelihood of causing damage to utility infrastructure can have a higher incident score.

In Step 508, method 500 can include determining a disposition with respect to the activity notification based on the incident score. In some embodiments, Step 508 is similar to Step 406 discussed in relation to FIG. 4. In some embodiments, a disposition can be ignore the notification, flag the notification for human review, transmit instructions to perform a physical task at the activity location; and/or provide information or instructions to an entity identified in the activity notification or some other third party. In some embodiments, a given disposition can be associated with an incident score or range of incident scores. For example, in some embodiments, a High incident score (e.g., 67%-100%) can correspond to flagging the notification for human review and instructing the entity associated with the activity to stop work pending the human review; a Medium incident score (e.g., 34%-66%), method 500 can correspond to transmitting instructions to a dispatch center to dispatch a technician to physically mark or identify the equipment around the activity location or to assist in the completion of the activity; and a Low incident score (e.g., 0%-33%) can correspond to ignoring the activity notification or transmitting instructions within the organization to ignore the activity notification.

In Step 510, method 500 can include transmitting a message including the disposition where the recipient is determined by the disposition. In some embodiments, Step 510 is similar to Step 408 discussed in relation to FIG. 4. In some embodiments, the message can be transmitted to internal recipients (e.g., within the utility company) or to external recipients. For example, in some embodiments, the message can be transmitted to an internal organization such as a dispatch center or an operations control center of the utility company. In some embodiments, the message can be transmitted to the entity identified in the activity notification.

FIG. 6 is a block diagram of a device according to some embodiments.

As illustrated, the device 600 can include a processor or central processing unit (CPU) such as CPU 602 in communication with a memory 604 via a bus 614. The device can also include one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 can comprise a general-purpose CPU. The CPU 602 can comprise a single-core or multiple-core CPU. The CPU 602 can comprise a system-on-a-chip (SoC) or a similar embedded system. In some embodiments, a graphics processing unit (GPU) can be used in place of, or in combination with, a CPU 602. Memory 604 can comprise a non-transitory memory system including a dynamic random-access memory (DRAM), static random-access memory (SRAM), Flash (e.g., NAND Flash), or combinations thereof. In one embodiment, the bus 614 can comprise a Peripheral Component Interconnect Express (PCIe) bus. In some embodiments, bus 614 can comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device 600 can optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 can comprise any input device arranged to receive input from a user. An illuminator in peripheral devices 612 can provide a status indication or provide light. The device can also comprise an input/output interface in peripheral devices 612 for communication with external devices, using communication technologies, such as USB, infrared, Bluetooth™, or the like. A haptic interface in peripheral devices 612 can provide a tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computer-implemented method for automated utility infrastructure protection comprising:

receiving, by a network interface, equipment inventory data comprising utility equipment identifiers and corresponding equipment geographic coordinates stored in a utility equipment database;

generating, using a processor, a digital equipment density matrix by calculating densities of utility equipment across a plurality of geographic locations, wherein the equipment density matrix comprises a data structure mapping geographic regions to equipment density values;

processing, by the processor, structured data records comprising historical activity notifications and incident reports by identifying activity notifications and incident reports having activity locations within a predetermined geographic distance and activity timeframes and incident dates within a predetermined time span, wherein the identifying comprises correlating the activity notifications and the incident reports based on the activity locations and the activity timeframes;

generating, by the processor, combined records for each location based on the identification;

training, using a gradient boosting machine learning algorithm, a location scoring model using the combined records and applying the trained location scoring model to generate a digital location-score heatmap data structure;

receiving, through the network interface, an activity notification including an activity location;

determining, by the processor executing the trained location scoring model, a location incident score for the activity location based on the digital location-score heatmap data structure by matching the activity location to the heatmap;

determining, by the processor based on predetermined score thresholds, an activity notification disposition based on the incident score;

transmitting, via the network interface, an electronic message including the disposition;

automatically storing, in a machine learning training database, the activity notification, the location incident score, and a result of the disposition as a new historical activity record in the training dataset; and periodically retraining the location scoring model using the gradient boosting machine learning algorithm with the updated training dataset.

2. The method of claim 1, wherein the disposition is selected from the group consisting of ignore the activity notification, flag the activity notification for human review, perform a physical task at the activity location, and provide instructions to an entity identified in the activity notification.

3. The method of claim 1, wherein the activity notification includes an entity and wherein the disposition is providing instructions to an equipment operator of the entity.

4. The method of claim 1, further comprising:

receiving an equipment inventory including equipment and corresponding equipment locations, at least some of the equipment locations corresponding to at least some of the plurality of locations;

generating an equipment density matrix, the equipment density matrix including a subset of the plurality of locations and a corresponding equipment density based on the equipment locations;

determining an incident score for each location in the subset by applying the location scoring model to each location in the subset; and generating a location-score heatmap including each location in the subset with the corresponding incident score.

5. The method of claim 4, wherein a feature of the historical activity notifications and incident reports is location data including coordinates, wherein the location data indicates a geographical area, and wherein the method further comprises expanding the geographical area by truncating the coordinates.

6. The method of claim 4, wherein a feature of the historical activity notifications is an activity timeframe and a feature of the historical incident reports is an incident date, and wherein generating the combined records includes combining activity notifications and incident reports having activity locations within a predetermined distance of each other and having activity timeframes and incident dates within a predetermined time span.

7. A non-transitory computer-readable storage medium for storing instructions for automated utility infrastructure protection executable by a processor, the instructions comprising:

receiving, by a network interface, equipment inventory data comprising utility equipment identifiers and corresponding equipment geographic coordinates stored in a utility equipment database;

generating, using the processor, a digital equipment density matrix by calculating densities of utility equipment across a plurality of geographic locations, wherein the equipment density matrix comprises a data structure mapping geographic regions to equipment density values;

processing, by the processor, structured data records comprising historical activity notifications and incident reports by identifying activity notifications and incident reports having activity locations within a predetermined geographic distance and activity timeframes and incident dates within a predetermined time span, wherein the identifying comprises correlating the activity notifications and the incident reports based on the activity locations and the activity timeframes;

generating, by the processor, combined records for each location based on the identification;

training, using a gradient boosting machine learning algorithm, a location scoring model using the combined records and applying the trained location scoring model to generate a digital location-score heatmap data structure;

receiving, through the network interface, an activity notification including an activity location;

determining, by the processor executing the trained location scoring model, a location incident score for the activity location based on the digital location-score heatmap data structure by matching the activity location to the heatmap;

determining, by the processor based on predetermined score thresholds, an activity notification disposition based on the incident score;

transmitting, via the network interface, an electronic message including the disposition;

automatically storing, in a machine learning training database, the activity notification, the location incident score, and a result of the disposition as a new historical activity record in a training dataset; and periodically retraining the location scoring model using the gradient boosting machine learning algorithm with the updated training dataset.

8. The computer-readable storage medium of claim 7, wherein the disposition is selected from the group consisting of ignore the activity notification, flag the activity notification for human review, perform a physical task at the activity location, and provide instructions to an entity identified in the activity notification.

9. The computer-readable storage medium of claim 7, wherein the activity notification includes an entity and wherein the disposition is providing instructions to an equipment operator of the entity.

10. The computer-readable storage medium of claim 7, wherein the instructions further comprise:

receiving an equipment inventory including equipment and corresponding equipment locations, at least some of the equipment locations corresponding to at least some of the plurality of locations;

generating an equipment density matrix, the equipment density matrix including a subset of the plurality of locations and a corresponding equipment density based on the equipment locations;

determining an incident score for each location in the subset by applying the location scoring model to each location in the subset; and generating a location-score heatmap including each location in the subset with the corresponding incident score.

11. The computer-readable storage medium of claim 10, wherein a feature of the historical activity notifications and incident reports is location data including coordinates, wherein the location data indicates a geographical area, and wherein the method further comprises expanding the geographical area by truncating the coordinates.

12. The computer-readable storage medium of claim 10, wherein a feature of the historical activity notifications is an activity timeframe and a feature of the historical incident reports is an incident date, and wherein generating the combined records includes combining activity notifications and incident reports having activity locations within a predetermined distance of each other and having activity timeframes and incident dates within a predetermined time span.

13. A device comprising a processor configured to perform a method for automated utility infrastructure protection comprising:

receiving, by a network interface communicatively coupled to the processor, equipment inventory data comprising utility equipment identifiers and corresponding equipment geographic coordinates stored in a utility equipment database;

generating, using the processor, a digital equipment density matrix by calculating densities of utility equipment across a plurality of geographic locations, wherein the equipment density matrix comprises a data structure mapping geographic regions to equipment density values;

processing, by the processor, structured data records comprising historical activity notifications and incident reports by identifying activity notifications and incident reports having activity locations within a predetermined geographic distance and activity timeframes and incident dates within a predetermined time span, wherein the identifying comprises correlating the activity notifications and the incident reports based on the activity locations and the activity timeframes;

generating, by the processor, combined records for each location based on the identification;

training, using a gradient boosting machine learning algorithm, a location scoring model using the combined records and applying the trained location scoring model to generate a digital location-score heatmap data structure;

receiving, through the network interface, an activity notification including an activity location;

determining, by the processor executing the trained location scoring model, a location incident score for the activity location based on the digital location-score heatmap data structure by matching the activity location to the heatmap;

determining, by the processor based on predetermined score thresholds, an activity notification disposition based on the incident score;

transmitting, via the network interface, an electronic message including the disposition;

automatically storing, in a machine learning training database, the activity notification, the location incident score, and a result of the disposition as a new historical activity record in the training dataset; and periodically retraining the location scoring model using the gradient boosting machine learning algorithm with the updated training dataset.

14. The device of claim 13, wherein the disposition is selected from the group consisting of ignore the activity notification, flag the activity notification for human review, perform a physical task at the activity location, and provide instructions to an entity identified in the activity notification.

15. The device of claim 13, wherein the activity notification includes an entity and wherein the disposition is providing instructions to an equipment operator of the entity.

16. The device of claim 13, wherein the instructions further configure the apparatus to:

receiving an equipment inventory including equipment and corresponding equipment locations, at least some of the equipment locations corresponding to at least some of the plurality of locations;

generating an equipment density matrix, the equipment density matrix including a subset of the plurality of locations and a corresponding equipment density based on the equipment locations;

determining an incident score for each location in the subset by applying the location scoring model to each location in the subset; and generating a location-score heatmap including each location in the subset with the corresponding incident score.

17. The device of claim 16, wherein a feature of the historical activity notifications and incident reports is location data including coordinates, wherein the location data indicates a geographical area, and wherein the method further comprises expanding the geographical area by truncating the coordinates.

18. The device of claim 16, wherein a feature of the historical activity notifications is an activity timeframe and a feature of the historical incident reports is an incident date, and wherein generating the combined records include combining activity notifications and incident reports having activity locations within a predetermined distance of each other and having activity timeframes and incident dates within a predetermined time span.

19. The computer-implemented method of claim 1, wherein correlating the activity notifications and the incident reports comprises:

comparing the activity locations of the activity notifications with incident locations of the incident reports to identify activity notifications and incident reports within the predetermined geographic distance; and comparing the activity timeframes of the activity notifications with the incident dates of the incident reports to identify activity notifications and incident reports within the predetermined time span, wherein the combined records comprise activity notifications and incident reports that are within both the predetermined geographic distance and the predetermined time span.

20. The computer-implemented method of claim 1, wherein the periodically retraining comprises:

retrieving the new historical activity record from the machine learning training database;

incorporating the new historical activity record into the training dataset with the historical activity notifications and incident reports; and retraining the location scoring model using the gradient boosting machine learning algorithm based on the incorporated training dataset to improve incident score predictions for subsequent activity notifications.

* * * * *